(12) United States Patent
Hashemi et al.

(10) Patent No.: US 11,300,116 B2
(45) Date of Patent: Apr. 12, 2022

(54) LONG-STROKE ROLLING DIAPHRAGM CYLINDER AND METHODS OF MAKING SAME

(71) Applicant: Regents of the University of Minnesota, Minneapolis, MN (US)

(72) Inventors: Saeed Hashemi, Minneapolis, MN (US); William Keith Durfee, Edina, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 115 days.

(21) Appl. No.: 16/551,330

(22) Filed: Aug. 26, 2019

(65) Prior Publication Data

US 2020/0132067 A1   Apr. 30, 2020

Related U.S. Application Data

(60) Provisional application No. 62/723,126, filed on Aug. 27, 2018.

(51) Int. Cl.
| | |
|---|---|
| *F04B 53/14* | (2006.01) |
| *F04B 53/02* | (2006.01) |
| *F15B 15/10* | (2006.01) |
| *F16J 3/02* | (2006.01) |
| *F04B 45/073* | (2006.01) |
| *B29C 65/00* | (2006.01) |

(52) U.S. Cl.
CPC ........ *F04B 45/0736* (2013.01); *B29C 66/432* (2013.01); *F04B 53/02* (2013.01); *F04B 53/143* (2013.01); *F15B 15/10* (2013.01); *F16J 3/02* (2013.01); *Y10T 29/49877* (2015.01)

(58) Field of Classification Search
CPC .... F04B 45/0736; F04B 53/143; F04B 53/02; F03C 1/013; F03C 1/002; F15B 15/10; F15B 2215/305; F16J 3/02; B29C 66/432; Y10T 29/49877
See application file for complete search history.

(56) References Cited

U.S. PATENT DOCUMENTS

| | | | | |
|---|---|---|---|---|
| 3,403,603 A | * | 10/1968 | Turner ..................... | F16J 3/06 92/99 |
| 3,794,538 A | * | 2/1974 | Christie ................ | B29C 70/326 156/187 |

(Continued)

OTHER PUBLICATIONS

Saeed Hashemi et al., "Low Friction, Long-Stroke Rolling Diaphragm Cylinder for Passive Hydraulic Rehabilitation Robots," ASME, Proceedings of the 2017 Design of Medical Devices Conference, pp. 1-2 (Apr. 10-13, 2017).

(Continued)

*Primary Examiner* — Bayan Salone
(74) *Attorney, Agent, or Firm* — Dicke, Billig & Czaja, PLLC (57) ABSTRACT

Hydraulic cylinders and methods of fabricating hydraulic cylinders, including long-stroke rolling diaphragm cylinders with any stroke length. In some embodiments, the cylinders are manufactured to have a stroke length to bore diameter ("stroke-to-bore") ratio optionally greater than 1:1. Various embodiments are suitable for use in a passive hydraulic body-powered wearable robot, for example.

14 Claims, 10 Drawing Sheets

(56) References Cited

U.S. PATENT DOCUMENTS 3,928,101 A * 12/1975 Tucker ............... B29D 99/005
 156/156
3,969,991 A * 7/1976 Comstock ............... F16J 3/06
 92/99

OTHER PUBLICATIONS

Saeed Hashemi et al., "Low-Friction Antagonist Hydraulic Transmission Using Long-Stroke Rolling Diaphragm Cylinders," Proceedings of the 2017 ASME/BATH Symposium on Fluid Power and Motion Control, pp. 1-7 (Oct. 16-20, 2017).
Saeed Hashemi et al., Low Friction Cylinder for Passive Hydraulic Rehabilitation Robot, Fluid Power Innovation and Research Conference FPIRC, pp. 1 (Oct. 14-16, 2015).
Saeed Hashemi et al., "Low Friction Cylinder for Passive Hydraulic Rehabilitation Robot", Wearable Robotics Conference—WearRAcon, pp. 1 (Feb. 10-12, 2016).
Jicheng Xia et al. "Experimentally Validated Models of O-Ring Seals for Tiny Hydraulic Cylinders," Proceedings of ASME/BATH 2014 Symposium on Fluid Power & Motion Control, pp. 1-6 (Sep. 10-12, 2014).
John P. Whitney et al., "A Low-Friction Passive Fluid Transmission and Fluid-Tendon Soft Actuator," IEEE/RSJ International Conference on Intelligent Robots and Systems (IROS 2014), pp. 2801-2808 (Sep. 14-18, 2014).
Michael B. Binnard, Design of a Small Pneumatic Walking Robot, Submitted to the Department of Mechanical Engineering in partial fulfillment of the requirements for the Degree of Master of Science, Massachusetts Institute of Technology, pp. 117 (Jan. 20, 1995).
Marc-Antoine Lacasse et al., "On the design of a statically balanced serial robot using remote counterweights," IEEE International Conference on Robotics and Automation (ICRA), pp. 4189-4194 (May 6-10, 2013).
Mark Gilbertson et al., "Force Analysis and Modeling of Soft Actuators for Catheter Robots," Proceedings of the ASME 2016 Dynamic Systems and Control Conference (DSCC2016) pp. 1-9 (Oct. 12-14, 2016).
Samuel M. Felton et al. "A Passive, Origami-Inspired, Continuously Variable Transmission," IEEE International Conference on Robotics & Automation (ICRA), pp. 2913-2918 (May 31-Jun. 7, 2014).
K. Koyanagi et al., Stabilizing Output of an Electrorheological Gel Linear Actuator, Journal of Intelligent Material Systems and Structures, vol. 22, pp. 1685-1692 (Oct. 2011).
Matti Linjama, "Digital Fluid Power-State of the Art," The Twelfth Scandinavian International Conference on Fluid Power, Tampere, Finland, pp. 23 (May 18-20, 2011).
Zhenyu Gan et al., A Novel Variable Transmission with Digital Hydraulics, IEEE/RSJ International Conference on Intelligent Robots and Systems (IROS), pp. 5838-5843 (Sep. 28-Oct. 2, 2015).
Jichen Xia et al., "Analysis of Small-Scale Hydraulic Systems," Transactions of the ASME, Journal of Mechanical Design, vol. 135, pp. 091001-1-091001-11 (Sep. 2013).
John P. Whitney et al., A Hybrid Hydrostatic Transmission and Human-Safe Haptic Telepresence Robot, IEEE International Conference on Robotics and Automation (ICRA), pp. 690-695 (May 16-21, 2016).
B. Stojanovic et al. "Friction and Wear in Timing Belt Drives," Tribology in Industry, vol. 32, No. 3, pp. 33-40 (2010).
E.E. Klaus et al., "Precise Measurement and Prediction of Bulk-Modulus Values for Fluids and Lubricants" Transactions of the ASME, Journal of Basic Engineering, pp. 469-473 (Sep. 1964).
M. Linjama et al., "Secondary Controlled Multi-Chamber Hydraulic Cylinder," The 11th Scandinavian International Conference on Fluid Power SICFP '09, pp. 1-15 (Jun. 2-4, 2009).
Leza Besemann, "Inventionevaluator, Objective idea analysis, Assess the Commercial Potential of your IP," Invention Name Apr. 7, 2018 Low Friction, Long-Stroke Rolling Diaphragm Cylinder for Passive Hydraulic Rehabilitation Robots, pp. 1-43 (Date of Report Jun. 15, 2018.

* cited by examiner

LONG-STROKE ROLLING DIAPHRAGM CYLINDER AND METHODS OF MAKING SAME

STATEMENT REGARDING FEDERALLY SPONSORED RESEARCH OR DEVELOPMENT

This invention was made with government support under 5R01EB019834-02 awarded by National Institutes of Health (NIH). The government has certain rights in the invention.

BACKGROUND

Hydraulic fluid power systems are known for their high-power density. The same force and power level of electro-mechanical systems can be reached by hydraulic fluid power systems with relatively lighter weight. Hydraulic devices produce considerable torque compared to the small size of the device. The fluid carries away the heat generated in the device and acts as a lubricant for the components. Flexible hoses, lightweight components, and variable transmission ratio in the system make the hydraulic transmissions a viable choice for robots designed to interact directly with humans. Hydraulic actuators have high stiffness and small position error.

A hydraulic cylinder converts hydraulic power to mechanical power and is the most common actuator for hydraulic systems. Friction and leakage of the cylinders are the most important factors that determine force and volume efficiencies in hydraulic systems.

O-ring seal, rolling diaphragm, and gap seal cylinders are three common technologies that have been used in different hydraulic systems for years. O-ring seal actuators use an O-ring seal between the piston and cylinder. Rolling diaphragm actuators have a diaphragm between the cylinder and piston which rolls back and forth. In gap seal cylinders, there is a gap between the piston and cylinder. Since it is a tradeoff between leakage and friction, leakage between the two chambers in these cylinders is tolerated to reduce friction. Commercial rolling diaphragms are manufactured using compression molding of a sheet rubber and woven fabric.

The present disclosure addresses problems and limitations with the related art.

SUMMARY

Rolling diaphragms manufactured by traditional processes using compression molding of a sheet rubber and woven fabric are limited to a stroke length being no greater than the bore of the cylinder. Rolling diaphragm cylinders with higher stroke-to-bore ratios could multiply the work per cycle of the system. Furthermore, rolling diaphragm cylinders having higher stroke-to-bore ratios would be beneficial as there are limitations of using short stroke length rolling diaphragm cylinders.

The disclosure relates to hydraulic cylinders having a long-stroke rolling diaphragm for small, passive hydraulic systems that can optionally be confirmed to have a stroke-to-bore ratio of greater than 1:1 (i.e. a stroke length to bore diameter ratio is greater than 1:1). The disclosure further includes methods of manufacturing long-stroke rolling diaphragms for hydraulic cylinders.

BRIEF DESCRIPTION OF THE DRAWINGS

FIG. 15B is a graph illustrating friction force of a cylinders as a function of velocity in 49.1 N.

FIG. 15C is a graph illustrating friction force of a cylinders as a function of velocity in 73.6 N.

DETAILED DESCRIPTION

Hydraulic actuators are commonly used in mechanical systems, and actuator efficiency is one of the most important factors in these systems. The energy loss to overcome friction force makes the actuator less efficient.

Embodiments of the disclosure include long-stroke rolling diaphragm ("LSRD") cylinders having approximately the same low friction as a gap seal and commercial rolling diaphragm cylinders as well as no fluid leakage. With various cylinders of the disclosure, unlike known rolling diaphragm cylinders that are restricted to a 1:1 "stroke-to-bore" size ratio (i.e. a stroke length to bore diameter ratio being not greater than 1:1), cylinders of the present disclosure can be fabricated with any stroke length (i.e. a stroke-to-bore size ratio greater than 1:1). Such cylinders having long-stroke rolling diaphragms are suitable for use in a passive hydraulic body-powered wearable robot, for example.

Figure 1:
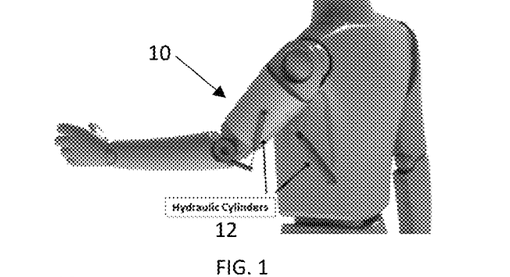
FIG. 1 is a perspective view of a wearable hydraulic rehabilitation robot including hydraulic cylinders.
Figure 2:
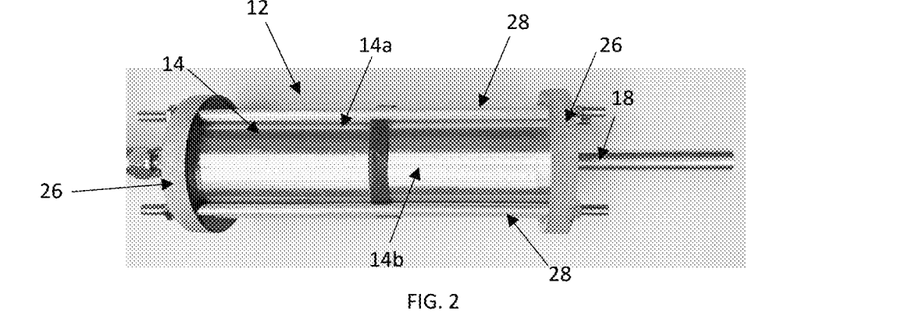
FIG. 2 is a side view of a hydraulic cylinder of the disclosure that can be used with the rehabilitation robot of FIG. 1, for example.
Figure 3:
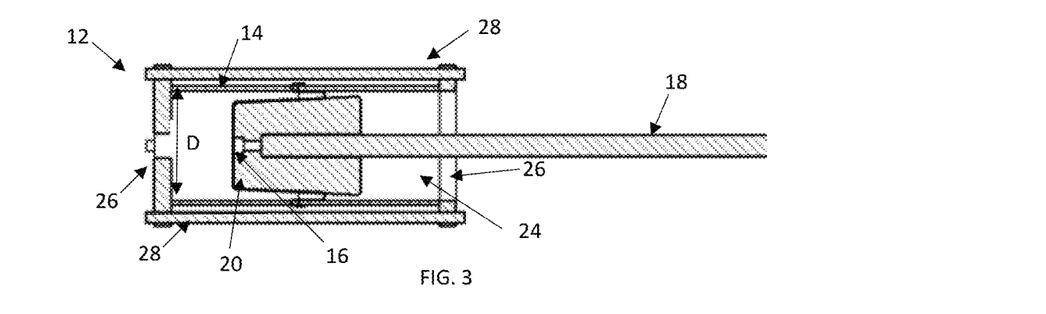
FIG. 3 is a cross-sectional view of the hydraulic cylinder of FIG. 2.

Although the disclosure is not intended to be limited to any particular application, FIG. 1 illustrates a wearable hydraulic rehabilitation robot 10 including one or more hydraulic cylinders 12 of the present disclosure. The hydraulic cylinders or "cylinders" 12, as shown in FIG. 2-3, each include a two-piece 14a, 14b cylinder body 14 housing a piston 16 and rod 18 as well as a diaphragm 20. The two pieces 14a, 14b of the cylinder body 14 can be positioned between two opposing discs 26, which along with a plurality of rods 28 (e.g., four rods 28), effectively clamp the pieces 14a, 14b together. The cylinder body 14 has a bore 24 defining a diameter D.

One example method of manufacturing a long-stroke rolling diaphragm 20 for use in a cylinder such as that of FIGS. 2-3 is generally illustrated in FIGS. 5-12. A long cylindrical mold 30 and short cylindrical mold 32 are provided along with a mold holder 34. The long mold 30 and the short mold 32 have an outer diameter equal to the desired inner diameter of the diaphragm being fabricated. The mold holder 34 has a flat base 36 and a groove 38 for receiving the long mold 30. All molds 30, 32, 34 can optionally be created via 3D printing.

Figure 4A:
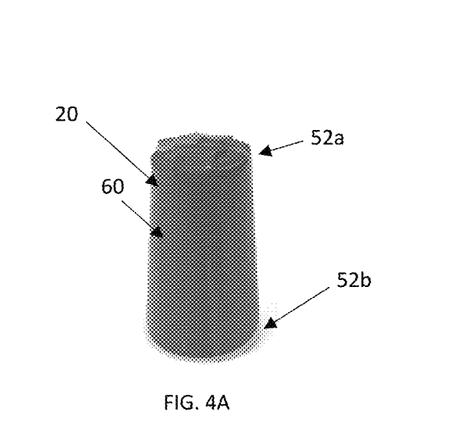
FIG. 4A is a perspective view of a long-stroke rolling diaphragm of the hydraulic cylinder of FIG. 2.
Figure 4B:
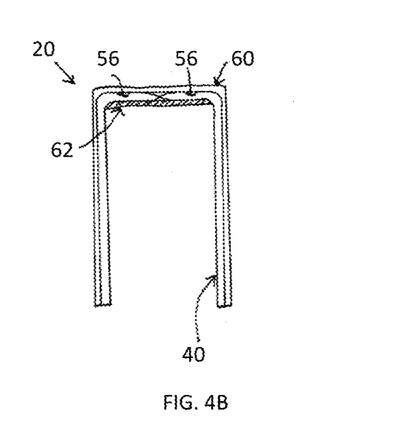
FIG. 4B is a cross-sectional view of the long-stroke rolling diaphragm of FIG. 4A.
Figures 5, 6, 7, 9, 10, 11:
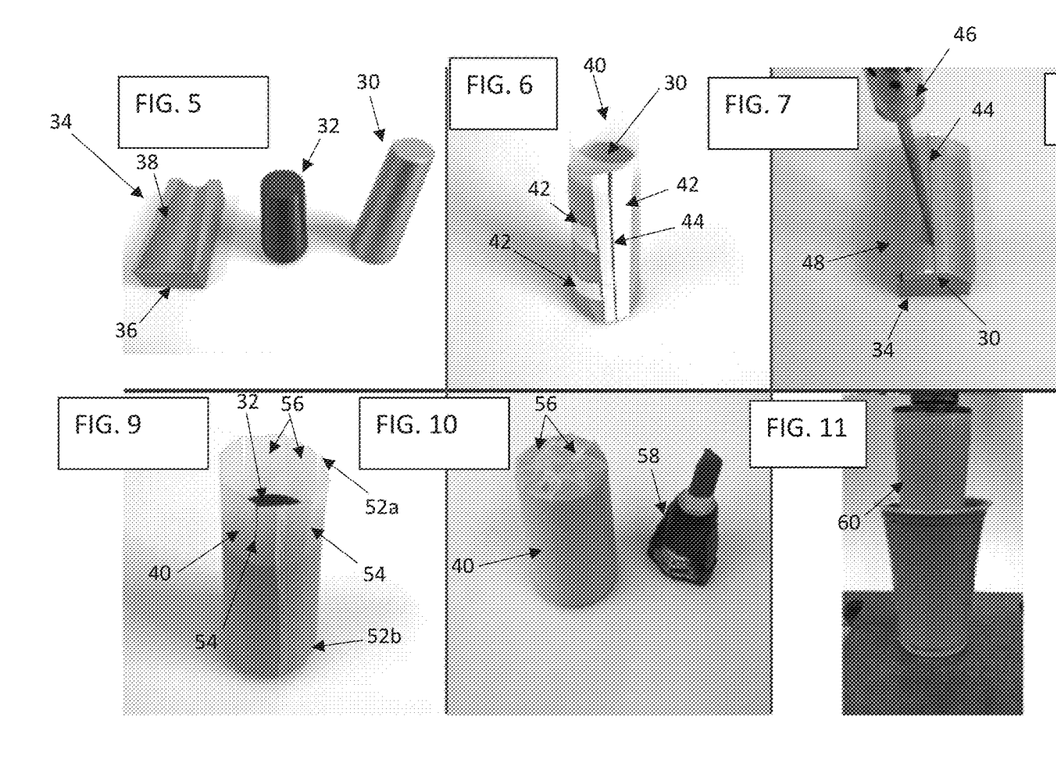
FIG. 5 is a perspective view of three molds used in the manufacture of the long-stroke rolling diaphragm of FIGS. 4A-4B.
FIGS. 6-12 illustrate one method of manufacturing the long-stroke rolling diaphragm of FIGS. 4A-4B.
Figure 8:
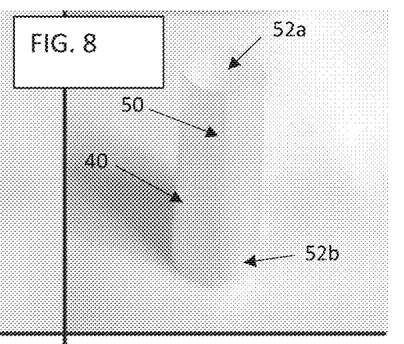
Figure 12:
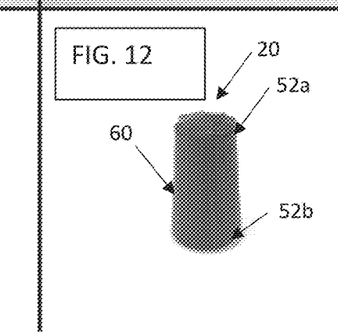

EXAMPLE A:

A sheet of polyurethane base material 40 is wrapped around the long mold 30 and kept in place, with tape 42, for example (FIG. 6). A second piece of tape 42 or the like is used to specify the base material seam that is to be sealed so that upon removal of the base material from the long mold 30, the base material 40 is maintained in a cylindrical configuration. A marker may be used to draw a guide line 44 on the tape 42 that indicates the area to be sealed. A hot knife 46 or the like can be used to trace the guide line 44 to form the seal (FIG. 7). In some embodiments, a polytetrafluoroethylene (PTFE or TEFLON®) protective sheet 48 is placed between the tape 42 and the hot knife 46 to protect the base material 40 from the excessive heat and provide a uniform heat application. After sealing along the guide line 44, the tape 42 can be removed and any excess base material 40 proximate the seal 50 (located where guide line 44) can be trimmed. After these processes, the base material 40 is in a cylindrical configuration (FIG. 8) having first and second ends 52a, 52b. Cuts 54 are formed on the first end 52a of the base material 40, which divides the first end 52a into a plurality of flaps 56, which can be folded in toward a center axis of the cylindrically wrapped base material 40 to form a closed first end 52a as is shown in FIG. 10 (only a select few of the cuts 54 and the flaps 56 are referenced for ease of illustration). Alternatively, the step of forming slits or cuts in the first end to form a plurality of flaps 56 in the base material 40 can be conducted prior to the step of securing the sheet of base material 40 into a cylindrical configuration. Cyanoacrylate adhesive 58 or the like is applied to each of the plurality of flaps 56 to secure all of the flaps 56 in an inwardly folded position as is generally shown in FIG. 10. In essence, the first end 52a is closed off with the flaps 56. Then, the base material 40 is deep coated in in an elastomer 60, such as polychloroprene or the like, in a vacuum chamber to remove any trapped gas. In one embodiment, the base material 40 is coated by dipping the base material 40 into a container containing elastomer for 10 seconds as is generally depicted in FIG. 11. Then, the elastomer coated base material can be cured. In one embodiment, the elastomer coated base material is cured in an oven at about 80 to about 85 degrees F. for about 8 to about 12 hours. Alternatively, other curing methods may be utilized, including air drying for an extended period of time (e.g., about 24 hours). One cured, epoxy 62 or the like is poured into the second end 52b and into an interior of the coated base material to seal the first end 52a of the diaphragm (see, e.g., FIG. 4B) and the epoxy 62 is allowed to dry for about one day. The diaphragm 20 is then ready to be placed into the cylinder body 14 in any known manner.

In an alternate method, largely similar to that described above, the base material 40 can be made of fabric and can be secured into a cylindrical configuration with fabric glue instead of heat sealing via the hot knife. Fabrics that work best are those that do not wrinkle easily. Cotton fabric is one suitable example. The method can be the same as that described above in all other respects.

EXAMPLE 1

Two long-stroke rolling diaphragms were made by the process outlined in Example A above with the base material being cotton fabric and having a final thicknesses of 0.33 and 0.58 mm. The variance in thickness of the long-stroke rolling diaphragms was controlled by choosing the cotton sheets or fabric base materials having different thicknesses. Each long-stroke rolling diaphragm that was tested had a 2:1 stroke-bore ratio. A burst pressure limit test was performed on each diaphragm by pumping oil into a LSRD cylinder including each long-stroke rolling diaphragm and measuring the pressure. Each long-stroke rolling diaphragm weighed 67 g with a polyetherimide (PEI) plastic rod and 3D printed case and piston.

Figure 13:
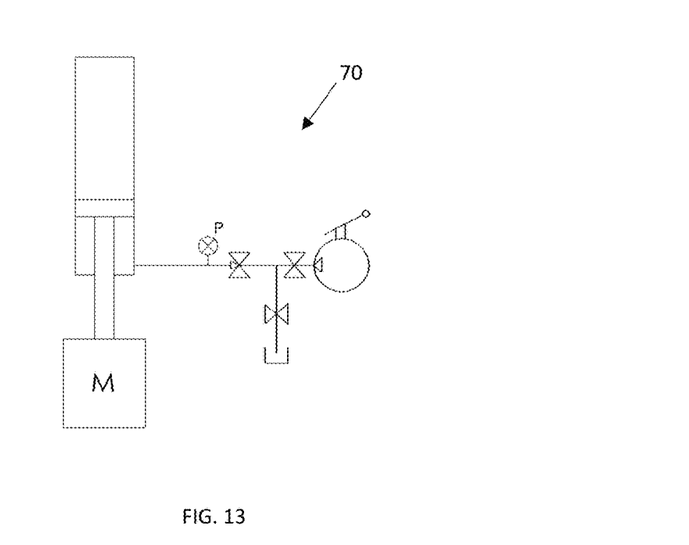
FIG. 13 is a schematic illustration of a test apparatus.

The apparatus 70 is schematically shown in FIG. 13, was used to test the cylinders at different velocities and loads. The following shows the force equilibrium for the piston $$Mg = PA + F_r \qquad (1)$$

Where M is the weight hanging from the piston, g is the gravitational acceleration, P is the pressure in the outlet, A is the piston rod side area, and $F_r$ is the friction force. A needle valve was used to adjust the velocity of the piston and maintain a constant velocity. The friction was calculated by finding the pressure in the outlet. The rod velocity was measured by a non-contacting position sensor to ensure that the velocity is constant and the force equilibrium is valid.

Test Protocol

Cylinders with bores in the range of 14 to 22 mm were chosen for the test. The O-ring, gap seal, rolling diaphragm, and LSRD cylinders had bores of 14.33, 15.88, 17.76, and 21.03 mm, respectively. With respect to the pressure limit of each cylinder and the maximum force which is needed for future studies, four loads and velocities were chosen. The test was repeated three times for each configuration to reduce the friction random action influence.

Figure 14:
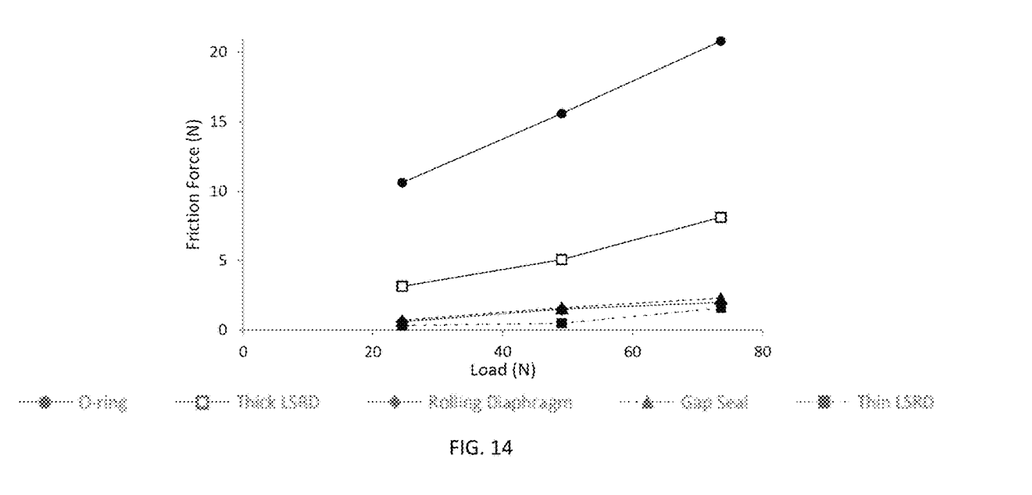
FIG. 14 is a graph illustrating friction force of different cylinders as a function of load.

Each test was performed three times and the average of each is shown in the following figures. FIG. 14 shows the cylinder friction force as a function of the load for 0.5 mm/s velocity. While the friction force goes up with the chamber pressure, a significant performance difference between the various cylinders can be seen in FIG. 14.

Figure 15A:
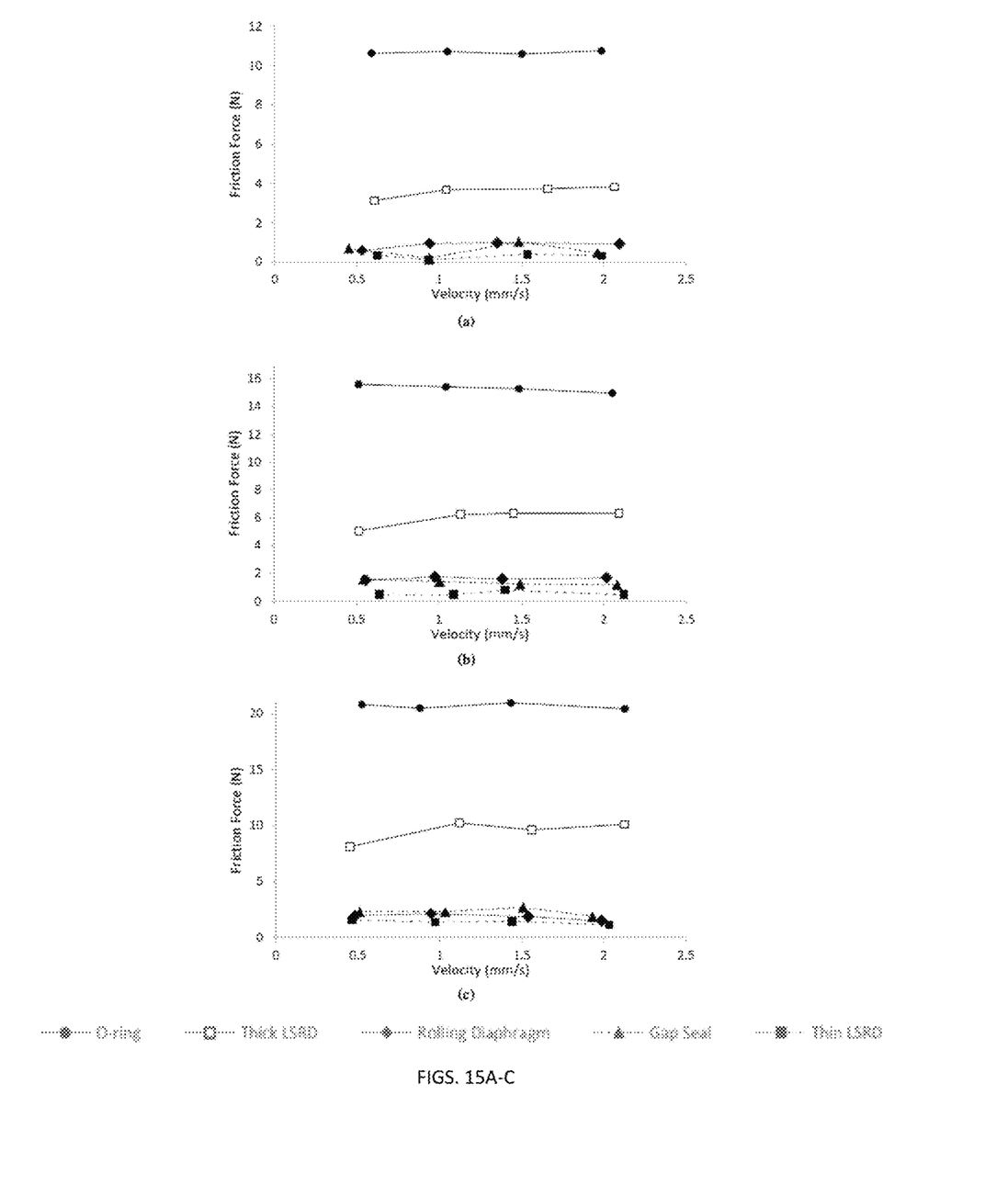
FIG. 15A is a graph illustrating friction force of a cylinders as a function of velocity in 24.5 N.

FIGS. 15A-C compare friction in different cylinders as a function of velocity for varying loads. In FIG. 15A the input force is 24.5 N, in FIG. 15B the input force is 49.1 N and in FIG. 15C the input force is 73.6 N. The performance difference of cylinders can be seen in this figure while the fluctuation of the friction force with velocity is negligible.

A fatigue test of 1000 cycles was performed on the thinner (0.33 mm) fabric-based diaphragm, and a burst pressure of 100 psi was reached after. It is noted that in an identically conducted experiment utilizing a polyurethane sheet-based long-stroke rolling diaphragm made by the process of FIGS. 5-12, a burst pressure of 350 psi was obtained.

Example 1 Results

The experimental results of this example demonstrate that friction for all types of cylinders increase with higher loads. However, system efficiency generally increases with higher pressures. The results from this example show that friction is independent of velocity for all the cylinders in this range of speed. However, there is a possibility of friction and velocity dependency at higher velocities.

The results of this example show a 28 to 40 percent of friction to load for O-ring cylinders. Therefore, this type of cylinder is not recommended for low pressure, passive hydraulic devices. The results indicate 2 to 5 percent friction force for gap seal and rolling diaphragm cylinders. As shown in FIGS. 15A-15C, the friction for these two cylinder types is almost the same. Passive hydraulic devices often need a force and volume efficient actuator with lower leakage than the gap seal and a longer stroke length than the current diaphragm technologies. Hysteresis is the only factor creating friction force against the movement in rolling diaphragms, and it is higher in thicker diaphragms. The friction is about 12 percent of the load for cylinders having thicker diaphragms. The results of this example show that friction in a thin LSRD cylinder is in the same range as the commercial rolling diaphragm and gap seal cylinders. LSRD cylinders, as disclosed herein, can have higher stroke-bore ratios, whereas all the cylinders including commercial rolling diaphragms have stroke-bore ratios of 1 or less.

The LSRD cylinder constructed for this study weighed about 67 g which is significantly lower than a comparable commercial model (e.g., Bellofram air cylinder 980-077-000, 367 g). It is noted that the weight of each long-stroke diaphragm is negligible as compared to the total weight of the LSRD cylinder. Therefore, it is believed that the LSRD cylinder tested is a good alternative for gap seal cylinders or for cylinders having rolling diaphragms, since they have a leakage problem and stroke limitations respectively. This example illustrates that various embodiments of the disclosure can be used in small hydraulic devices to achieve high force and volume efficiency.

EXAMPLE 2

The most basic concept of antagonist passive transmission can be shown by pairing two cylinders against one another. LSRD cylinders made by the process outlined in Example A above utilizing a cotton fabric base material were used in the testbed because of their low friction and zero leakage. The rolling diaphragm cylinder cannot maintain reverse pressure because it would invert and cause the diaphragm to jam. The system was pre-pressurized to prevent reverse pressure on cylinders and reduce the system backlash. Three ways to preload the cylinders in the transmission were considered as are shown in FIG. 16.

Figure 16:
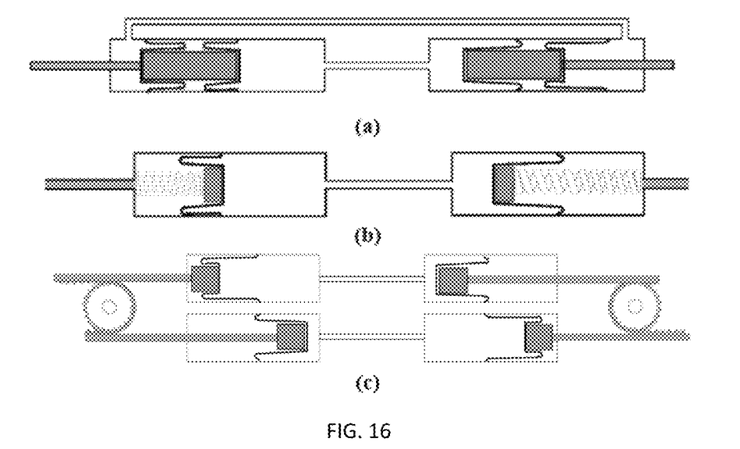
FIG. 16 schematically illustrates three actuation types (a), (b), (c), with preloading capability using long-stroke rolling diaphragm cylinders.

Configuration (a) shown in FIG. 16 uses two engaged double acting rolling diaphragm ("RD") cylinders for the transmission. With the use of only two cylinders, the weight of this transmission is an advantage for wearable robotics. Configuration (b) shown in FIG. 16 uses springs to preload the single acting cylinders. This type was not a viable choice because energy loss in the springs reduces the efficiency. The fluid system provides substantial force density and can replace springs. Configuration (c) shown in FIG. 16 uses a timing belt and pulley system to engage the two series of single-acting cylinders without springs for a rotary antagonist transmission.

Figure 17:
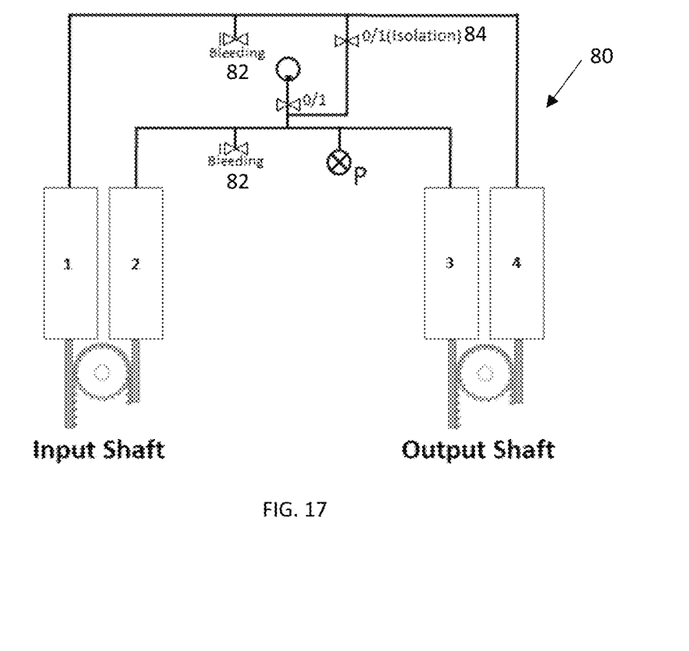
FIG. 17 is a schematic illustration of an antagonist transmission testbed hydraulic circuit.

Configuration (c) was used for the passive transmission testbed studied here. Rotary shafts were placed on the input and output to implement quantitative tests on the transmission. Engaging two lever arms using the transmission without any valves in the system made a testbed for evaluating friction, tracking, stiffness, impulse response, and step response of the system. FIG. 17 shows the hydraulic circuit that was used for the transmission device.

All cylinders of this example had the same bore size. A hand pump P was used to pressurize system 80. System air removal was done using bleed valves 82 in the circuit. All the manual valves were closed to isolate cylinders 2 and 3 from cylinders 1 and 4. The transmission ratio between input and output was 1:1. The transmission ratio was configured to be 1:−1 by connecting cylinder 3 to 1 and 4 to 2. There was no engagement between input and output in the transmission when isolation valve 84 was open and the stiffness was almost zero for this case.

Figure 18:
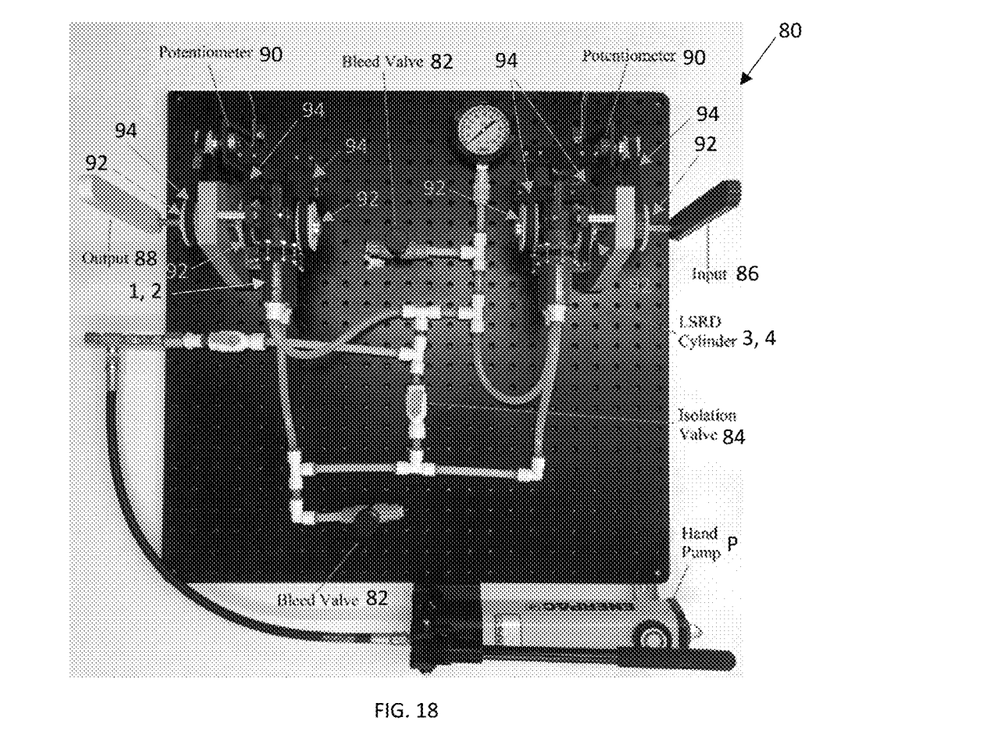
FIG. 18 is a photograph of the antagonist transmission testbed hydraulic circuit of FIG. 7.
Figure 19:
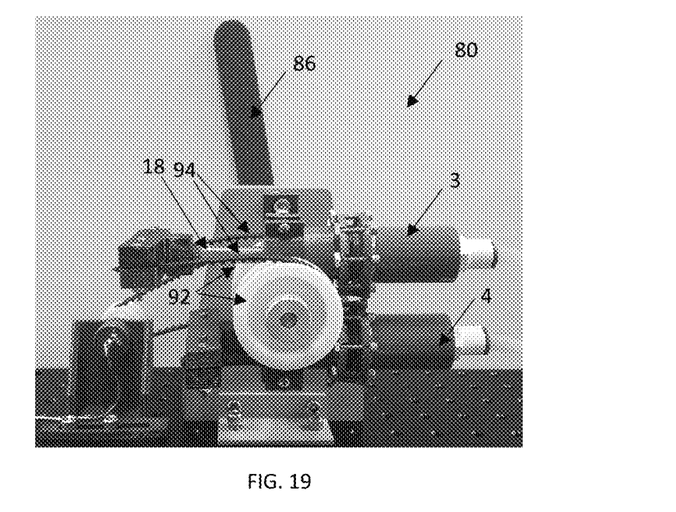
FIG. 19 is a photograph of the antagonist transmission testbed hydraulic circuit of FIGS. 17-18.

An antagonist passive transmission was constructed for system testing as is illustrated in FIG. 18. The cylinders 1-4 each had a 1.5 inch stroke length, and with 2 inch pulleys 92, provided a 90-degree rotation for the input and output shafts 86, 88. Timing belts 94 were tightened by pre-pressurizing the cylinders 1-4 since both cylinder rods 18 move in the same direction (only one rod 18 is clearly visible FIG. 19). The angles on the input and output shafts were measured using two potentiometers 90 (Bourns Inc., 6639S-1-103).

Tests for Example 2

Several tests were performed on the LSRD cylinders 1-4 made by the process of Example A above utilizing a cotton fabric base material and the transmission device using the 1:1 transmission ratio configuration. The tests included: friction, stiffness, tracking, impulse response, and step response. System tests were conducted at three preload pressures using mineral oil for the working fluid.

1. Friction: The friction test was performed using a custom-motorized test stand equipped with a linear force sensor (e.g., Mark-10®, M5-200 both available from Mark-10 Corporation of Copiague, N.Y.) that was coupled to the input shaft 86 while the output shaft 88 was unloaded. Stiction is the break-away torque at the instant that the output shaft 88 starts rotating and friction is the torque measured when the output shaft 88 is rotating at a constant velocity. The friction and velocity are independent for these cylinders at velocities lower than 2 mm/s.

2. Stiffness: The stiffness of the transmission was measured by applying torque on the input shaft 86 by custom-motorized test stand and measuring the input shaft 86 angle and torque while the output shaft 88 was locked.

3. Tracking: Two lever arms were placed on input and output shafts 86, 88 to demonstrate the backdrivability of the transmission (FIG. 18). The output follows the input for a transmission ratio of 1:1 and the angle tracking can be evaluated. An input manipulation was performed at various velocities while measuring the input and output shaft 86, 88 angles.

4. Impulse and step responses: An impulse input was applied to the system 80 using a hammer while the output shaft 88 was locked to the force sensor. The input angle and output torque were measured. A torque step input was applied to the input shaft 86 by releasing a weight with zero velocity from a pulley 92 on the input shaft 86 and locking the output shaft 88 to the force sensor.

Example 2 Results

1. Friction: The torque needed to overcome resistance in the transmission was measured. The friction was caused by the diaphragms, several timing belts, and bearings in the system. To differentiate these two friction sources, the friction test results on a single LSRD cylinder was used. The torque was applying on the input shaft using custom-motorized test stand and measured by the force sensor while monitoring the output angle.

Figure 20:
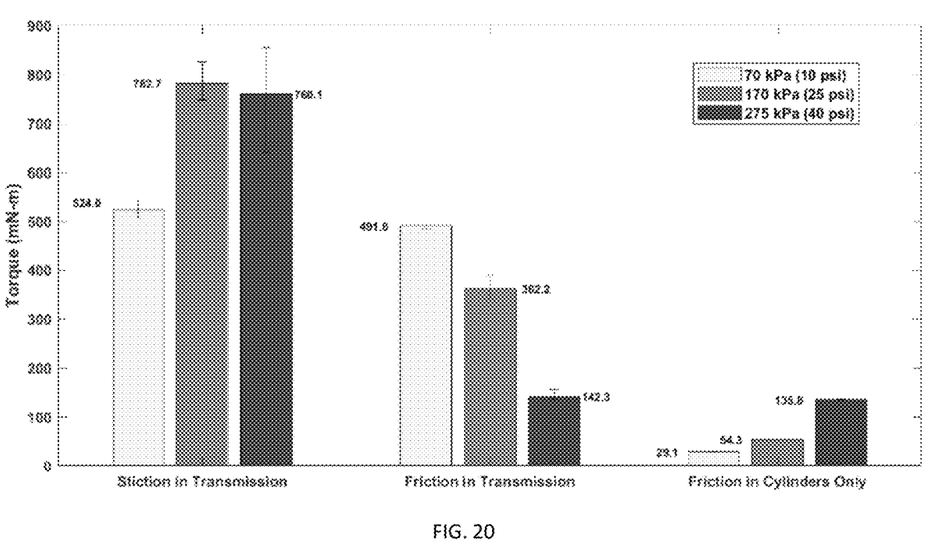
FIG. 20 is a graph illustrating stiction and friction of the device and single cylinders with preload pressure.

FIG. 20 shows the friction torque in mN-m (millinewton meter) for several preload pressures. When the output shaft is stationary, the torque applied on the input shaft is stiction, and when it moves at constant velocity, the input torque is friction.

As shown in FIG. 20, the friction decreases with pressure because the system stiffens. Unlike the friction, the same pattern was not seen for stiction.

Figure 21:
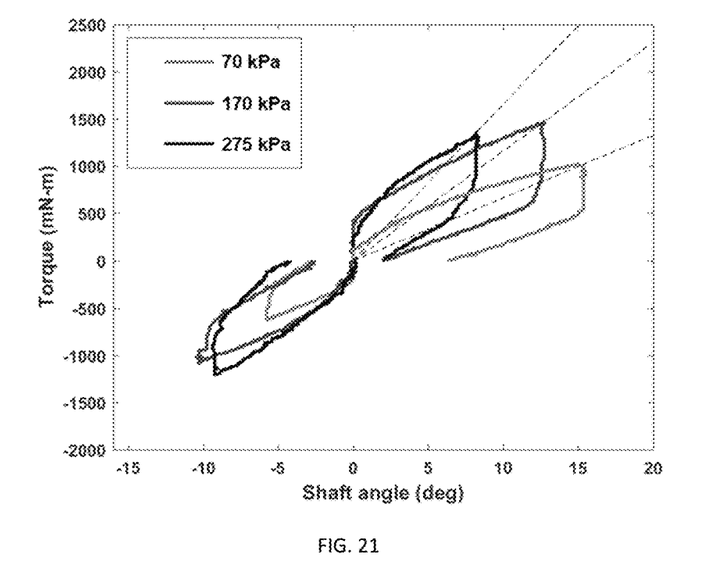
FIG. 21 is a graph illustrating transmission stiffness with preload pressure.

2. Stiffness: FIG. 21 shows the stiffness of the system in different preload pressures. The transmission stiffness increases with preload pressure in cylinders. The stiffness for 275 kPa preload pressure was 166 mN-m/deg. The input shaft angle was monitored in this test; therefore, the vertical line in stiffness plot shows the stiction for the input shaft. Stiction is 119.8, 453.5, and 276.7 mN-m for 70, 170, and 275 kPa respectively. Stiction was 524, 783, 760 mN-m for 70, 170, and 275 kPa in the friction test while the output shaft was being observed. In both cases, highest stiction has been seen at 170 kPa.

Figure 22:
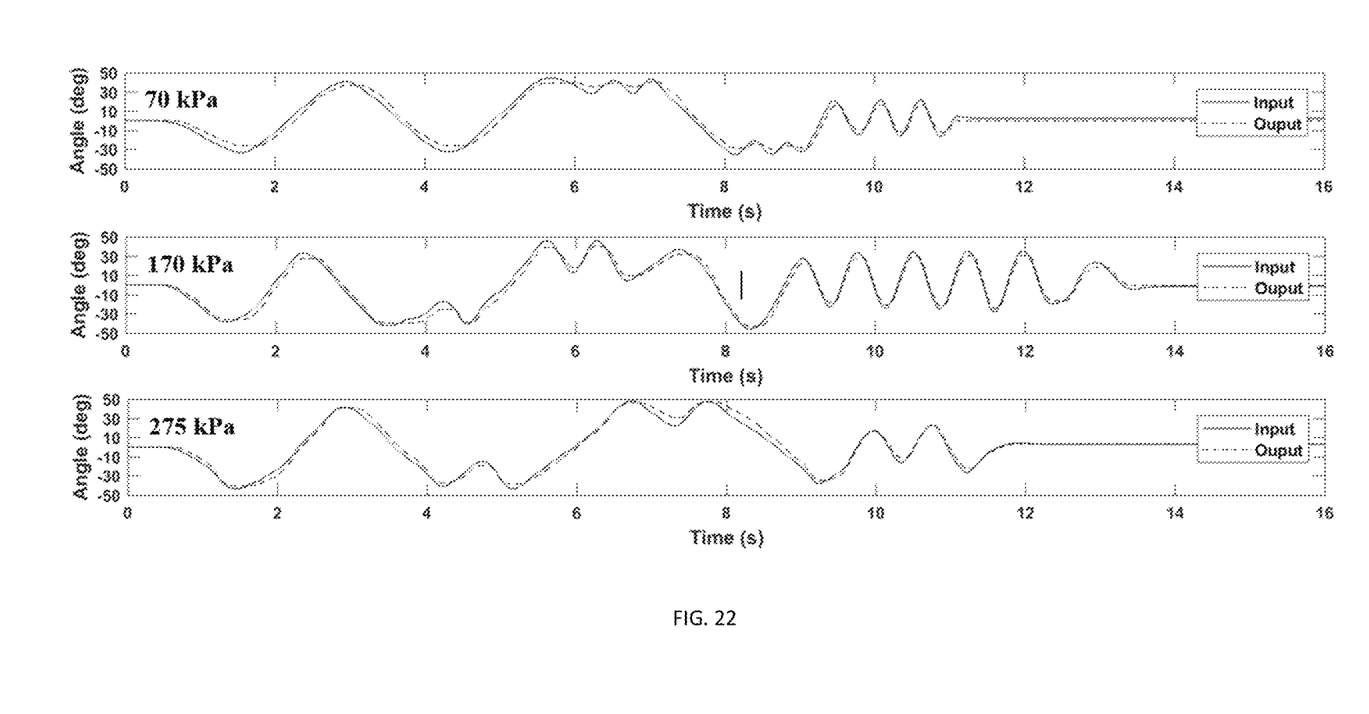
FIG. 22 is a graph illustrating output tracks the randomly manipulated input over time.

3. Tracking: The unloaded input arm was manipulated at various speeds to evaluate the backdrivability of the transmission. FIG. 22 shows the unloaded output tracking the input over time for several preload pressures.

Figure 23:
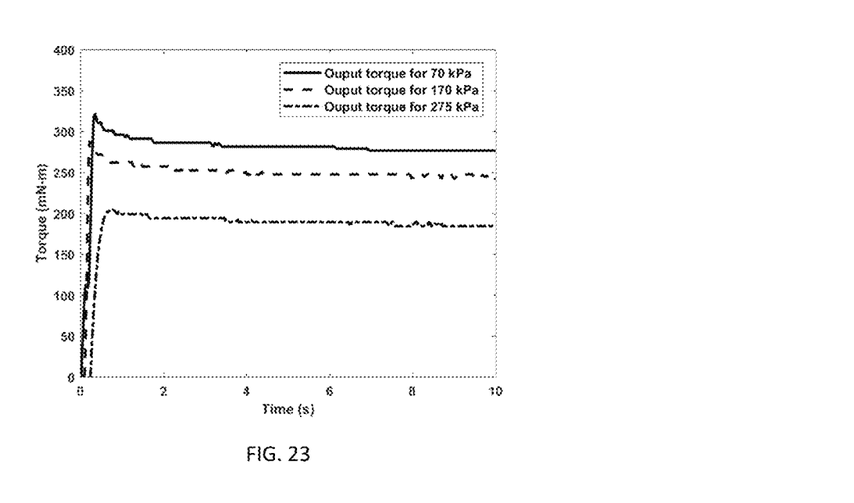
FIG. 23 is a graph illustrating output torque for 1100 mN-m step torque input.
Figure 24:
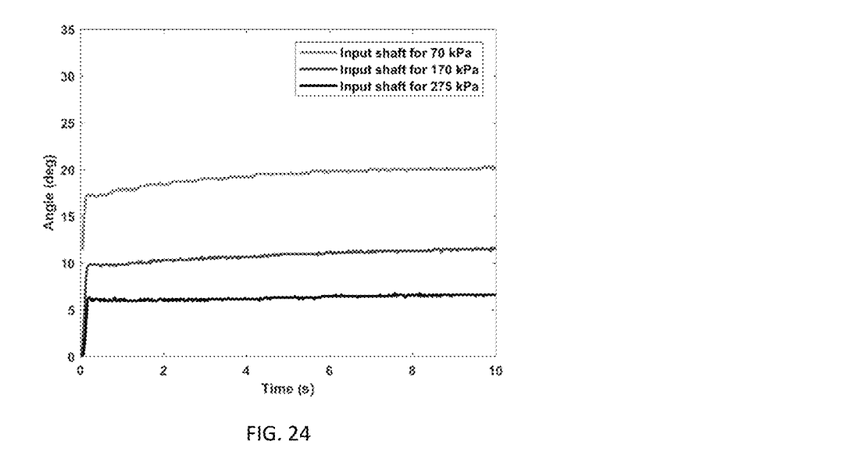
FIG. 24 is a graph illustrating input shaft angle for 1100 mN-m step torque input.

4. Impulse and Step Response: The output torque response to a torque step input is shown in FIG. 23 for several preload pressures. FIG. 24 shows the input shaft angle response to the same torque step input.

Less input angle changes were seen in higher pressures. It shows that the system was stiffer at higher pressure, while the output was engaged to the stationary force sensor, the shafts rotated less.

Figure 25A:
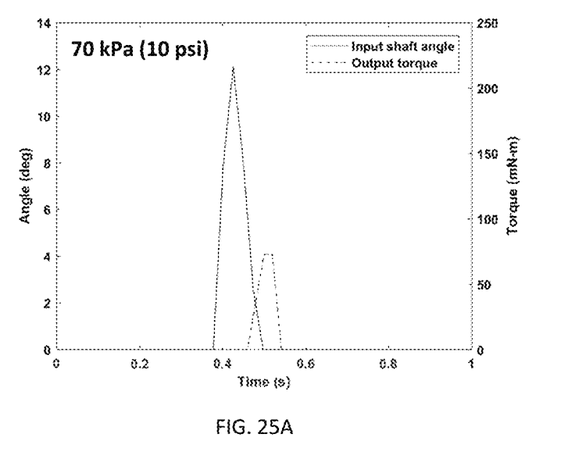
FIGS. 25A-25C are graphs illustrating input shaft angle and output torque for a hammer impulse input.
Figure 25B:
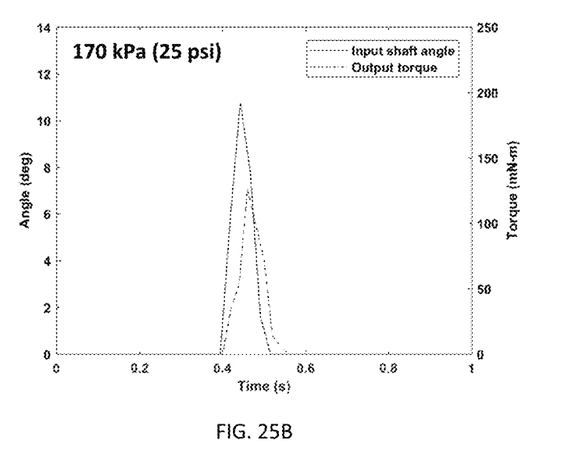
Figure 25C:
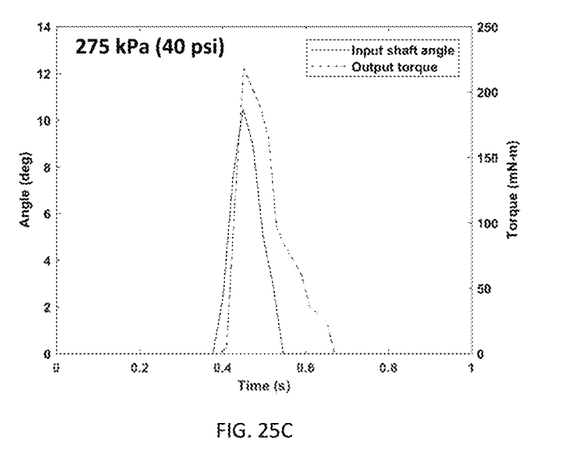

The hammer impulse response is shown in FIGS. 25A-25C. Higher power transmission can be seen in higher pressures because the system was stiffer.

Friction in a single LSRD cylinder has been measured and the equivalent value for four cylinders being used in the transmission device was between 29 to 136 mN-m for three pressures (FIG. 20). With the device testing setup, the timing belts get tighter at higher pressures and decreases the friction in the system. Friction in the device approached the ideal equivalent friction in cylinders subjected to higher pressures. At 275 kPa, these values were substantially close to one another, suggesting that this pressure is the recommended pressure for the transmission device use. Stiction seen in this test was the torque needed in input shaft to move the output shaft. The stiction in FIG. 21 can be seen in a vertical line when the angle is zero and torque is increasing, and it was the required torque to move the input shaft and was less than the stiction in the friction test. This discrepancy is attributed to the fluid and timing belts that transmit the input movement to the output.

The stiffness increased from 66 to 166 mN-m/deg when the pressure was raised from 70 kPa to 275 kPa. The increase in stiffness resulted from the timing belts, which were stretched, and therefore stiffer at higher pressures.

The output followed the input manipulation (FIG. 22). Poor tracking can be seen at lower pressures than 275 kPa. Hysteresis is observed at 70 and 170 kPa when the input arm was in rest after manipulation, but the output angle was different from the input angle. At 275 kPa, shaft angles matched during manipulation, which demonstrates low hysteresis for this pressure.

The output shaft was engaged to a stationary force sensor in the step response test, it leaded the resistance torque to be in stiction region and not friction. Since the stiction has been seen greater at higher pressures, the output torque response to a torque step input shows higher torque transmitted in lower pressures. Higher power is expected to be transmitted at high pressures for a moving step response test setup. The input shaft angle was lower for higher pressures in the step response test and it shows that the system stiffens at higher pressures (FIG. 24).

In the impulse test, for the same input shaft rotation, higher input torque was needed at higher pressures, and it caused higher output torque (FIGS. 15A-15C). Time delay in impulse decreased from 82.4 to 14.0 ms when the pressure was raised from 70 to 275 kPa. The effect of bulk modulus is not evaluated since the mineral oil bulk modulus change from 70 to 275 kPa is negligible.

Example 2 Conclusion

LSRD cylinders of the disclosure offer low friction, zero leakage, and long stroke length compared to the O-ring, gap seal, and commercial rolling diaphragm. LSRD cylinders are being used in an antagonist passive hydraulic transmission. Several tests have been conducted to evaluate the dynamic performance of the LSRD cylinders and the antagonist transmission device.

Commercial rolling diaphragm cylinders are not able to have stroke to bore ratio greater than 1:1. Using LSRD cylinders of the present disclosure gives the input and output shafts 90-degree rotation capability with 2-inch pulleys compared to 60 degree using commercial rolling diaphragm cylinders with the same bore size. Since no limitation exists regarding stroke length of the LSRD cylinders of the present disclosure the rotation range can be increased using longer stroke cylinders or smaller pulleys based on the application. LSRD cylinders of the present disclosure can retain long diameter pulleys for higher torque, while still attaining long angular displacement. The tests demonstrate satisfactory performance of LSRD cylinders of the present disclosure for applications that need longer stroke lengths.

The friction of the device is comparable to the friction caused by the cylinders at higher pressures because the system stiffens and timing belts tightens. Friction of 155 mN-m and stiffness of 166 mN-m/deg are measured for the device with 275 kPa preload pressure.

Output shaft tracks the input manipulation better at higher pressures, and at 275 kPa the hysteresis approaches zero. Step and impulse tests demonstrate system fast behaviors and show acceptable performance at 275 kPa preload pressure.

The performance of the transmission device in several tests shows that 275 kPa (40 psi) of preload pressure is needed for a satisfactory performance. There is a fully elastomer commercial rolling diaphragm cylinders with longer stroke length, which has a 170-kPa pressure limit. The performance of 170 kPa preloaded system shows that these commercial rolling cylinders are not appropriate to use in this device, and cylinders with higher pressure limit are needed. The performance can be improved by substituting the 3D-printed cylinders with aluminum versions to increase volume efficiency. This device can be used for different applications in robotics from passive wearable robots to telepresence robots. This fixed transmission ratio can be variable by adding on/off valves to the device to control the cylinders' connection.

Although the present disclosure has been described with reference to preferred embodiments, workers skilled in the art will recognize that changes can be made in form and detail without departing from the spirit and scope of the present disclosure. For example, as will be understood in view of the present disclosure, the teachings of this disclosure have many applications including low pressure hydraulic systems in robotics, biomedical, biomechanical and other hydraulic applications.

What is claimed is:

1. A method of manufacturing a diaphragm comprising:
   providing a sheet of base material;
   securing the sheet of base material into a cylindrical configuration having a first end, a second end and defining a center axis;
   forming slits in the first end to form a plurality of flaps in the base material;
   folding the flaps in an overlapping fashion toward the center axis;
   securing the flaps in the overlapping fashion;
   applying an elastomer to the base material in a vacuum chamber;
   curing the elastomer; and
   applying an epoxy proximate the flaps.

2. The method of claim 1, wherein the base material is fabric.

3. The method of claim 1, wherein the base material is polyurethane.

4. The method of claim 1, wherein the step of curing includes curing at a temperature between 80 and 85 degrees F.

5. The method of claim 1, wherein the step of curing includes curing for a period of time between 8 and 12 hours.

6. The method of claim 1, further comprising providing a first mold and rolling the sheet of base material around the first mold to form the cylindrical configuration.

7. The method of claim 6, further comprising positioning the first mold and the cylindrical configuration into a mold holder.

8. The method of claim 6, further comprising taping the base material to secure the base material in the cylindrical configuration.

9. The method of claim 8, further comprising drawing a line along the tape at a seam formed by the base material in the cylindrical configuration.

10. The method of claim 9, further comprising tracing the line with a hot knife.

11. The method of claim 6, further comprising removing the first mold from the cylindrical configuration after the base material is secured in the cylindrical configuration.

12. The method of claim 11, further comprising inserting a second mold into the cylindrical configuration; wherein the first mold has a length greater than a length of the second mold.

13. The method of claim 1, wherein the flaps are secured in overlapping fashion with adhesive.

14. The method of claim 1, wherein the step of forming slits in the first end to form a plurality of flaps in the base material is conducted prior to the step of securing the sheet of base material into a cylindrical configuration.

* * * * *